United States Patent [19]

Hummer

[11] Patent Number: 5,368,319
[45] Date of Patent: Nov. 29, 1994

[54] ELEVATOR CART APPARATUS

[76] Inventor: Robert E. Hummer, 509 Speedway Ave., Missoula, Mont. 59802

[21] Appl. No.: 65,398

[22] Filed: May 24, 1993

[51] Int. Cl.$^5$ .............................................. B62B 3/02
[52] U.S. Cl. .................................. 280/46; 280/43.17; 280/47.34
[58] Field of Search ............... 280/43.17, 43.16, 638, 280/47.34, 46

[56] References Cited

U.S. PATENT DOCUMENTS

| | | | |
|---|---|---|---|
| 703,744 | 7/1902 | Scott | 280/46 |
| 865,987 | 9/1907 | Barlow | 280/46 |
| 979,093 | 12/1910 | Porteous | 280/46 |
| 1,763,535 | 6/1930 | Nuttall | 280/46 X |
| 2,077,265 | 4/1937 | Reed | 280/46 |
| 2,485,797 | 10/1949 | Will | 280/47.34 |
| 3,137,250 | 6/1964 | Hutchinson | 280/47.34 X |
| 3,544,127 | 12/1970 | Dobson | 280/43.17 |
| 4,213,624 | 7/1980 | Sanders | 280/43.17 X |
| 5,186,479 | 2/1993 | Flowers | 280/47.35 |

Primary Examiner—Karin L. Tyson
Assistant Examiner—Carla Mattix
Attorney, Agent, or Firm—E. Michael Combs

[57] ABSTRACT

An elevator cart is arranged to include a first tubular frame mounting a second tubular frame thereto in a reciprocating relationship relative to the first tubular frame to permit selective lifting of a workpiece on the second tubular frame relative to the first tubular frame. To this end, a handle is pivotally mounted to the first tubular frame simultaneously displacing an actuator link that in turn is arranged to rotate simultaneously a plurality of cam rods, with each cam rod having a plurality of cam members in abutment with the second tubular frame to effect a lifting and lowering of the second tubular frame upon pivoting of the handle.

5 Claims, 5 Drawing Sheets

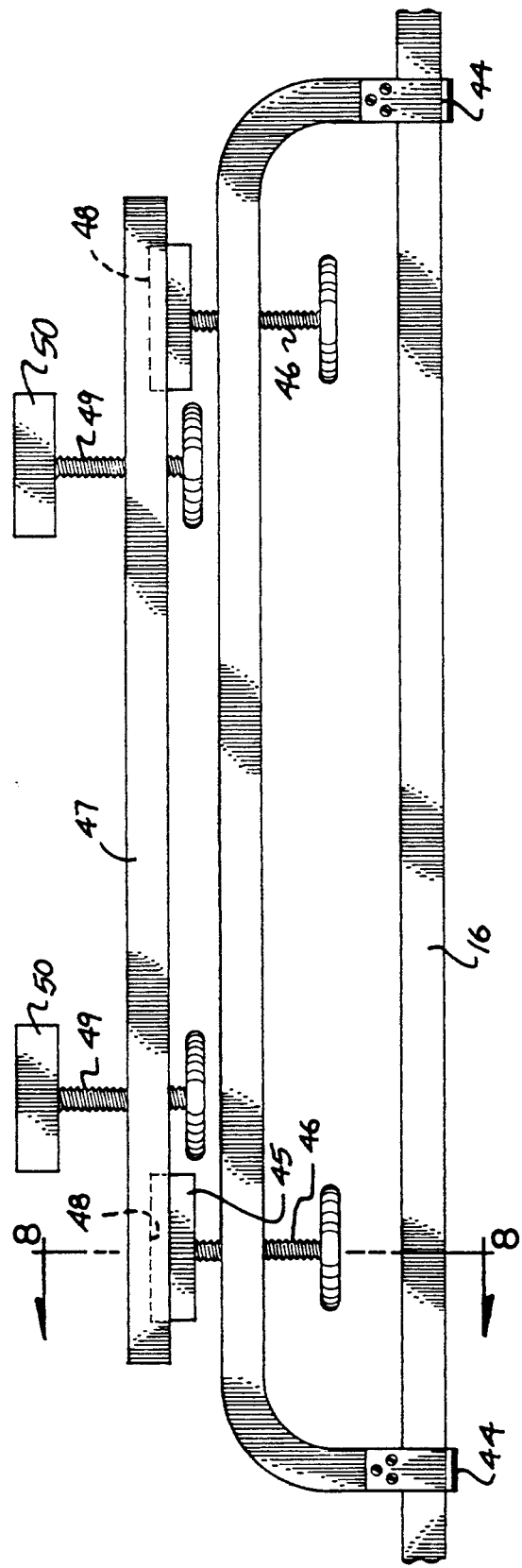
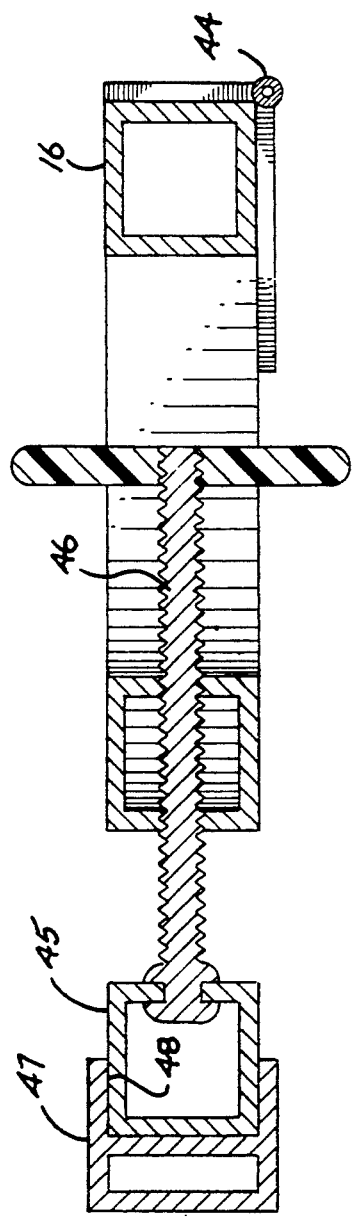
FIG. 7
FIG. 8

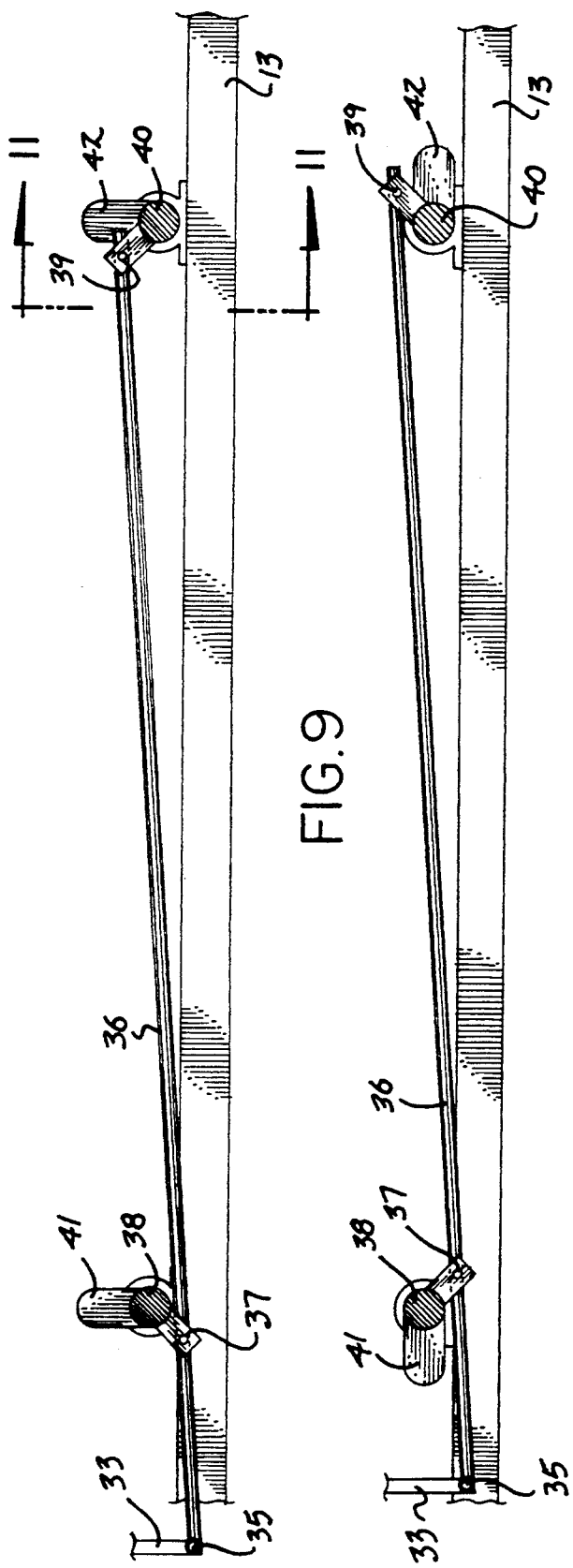
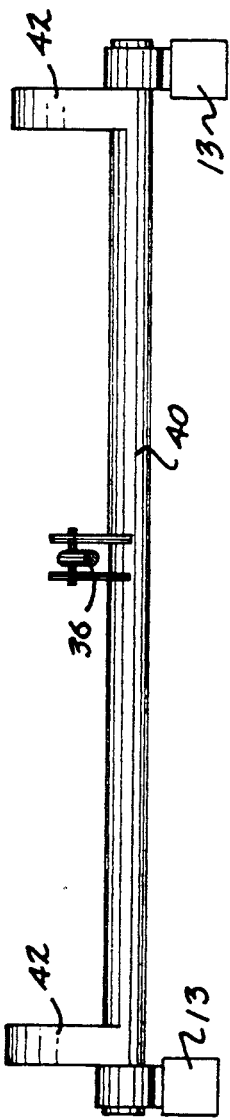
FIG. 9
FIG. 10
FIG. 11

ELEVATOR CART APPARATUS

BACKGROUND OF THE INVENTION

1. Field of the Invention

The field of invention relates to cart apparatus, and more particularly pertains to a new and improved elevator cart apparatus wherein the same provides for the selective lifting of a workpiece relative to the cart structure.

2. Description of the Prior Art

The prior art has heretofore provided various cart structure such as indicated in U.S. Pat. Nos. 3,679,227; 3,815,933; 5,044,645; 4,178,006; and 4,735,424.

The instant invention attempts to overcome deficiencies of the prior art by providing for a cart structure providing for a framework arranged for displacement relative to an underlying framework to provide for the lifting of various workpieces upon the framework structure and in this respect, the present invention substantially fulfills this need providing for the lifting and subsequent transport of a workpiece.

SUMMARY OF THE INVENTION

In view of the foregoing disadvantages inherent in the known types of cart structure now present in the prior art, the present invention provides an elevator cart apparatus wherein the same is arranged to provide for a second frame arranged for displacing relative to a first frame permitting lifting of workpiece components relative to a second frame. As such, the general purpose of the present invention, which will be described subsequently in greater detail, is to provide a new and improved elevator cart apparatus which has all the advantages of the prior art cart apparatus and none of the disadvantages.

To attain this, the present invention provides an elevator cart arranged to include a first tubular frame mounting a second tubular frame thereto in a reciprocating relationship relative to the first tubular frame to permit selective lifting of a workpiece on the second tubular frame relative to the first tubular frame. To this end, a handle is pivotally mounted to the first tubular frame simultaneously displacing an actuator link that in turn is arranged to rotate simultaneously a plurality of cam rods, with each cam rod having a plurality of cam members in abutment with the second tubular frame to effect a lifting and lowering of the second tubular frame upon pivoting of the handle.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved elevator cart apparatus which has all the advantages of the prior art cart apparatus and none of the disadvantages.

It is another object of the present invention to provide a new and improved elevator cart apparatus which may be easily and efficiently manufactured and marketed.

It is a further object of the present invention to provide a new and improved elevator cart apparatus which is of a durable and reliable construction.

An even further object of the present invention is to provide a new and improved elevator cart apparatus which is susceptible of a low cost of manufacture with regard to both materials and labor, and which accordingly is then susceptible of low prices of sale to the consuming public, thereby making such elevator cart apparatus economically available to the buying public.

Still yet another object of the present invention is to provide a new and improved elevator cart apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is an orthographic view of a further modified side rail structure.

FIG. 8 is an orthographic view, taken along the lines 8—8 of FIG. 7 in the direction indicated by the arrows.

FIG. 9 is an orthographic view of the lift mechanism arranged in a first position to effect lifting of the second frame relative to the first frame.

FIG. 10 is an orthographic view indicating the lift structure in a second position providing for the lowering of the second frame towards the first frame.

FIG. 11 is an orthographic view, taken along the lines 11—11 of FIG. 9 in the direction indicated by the arrows.

DESCRIPTION OF THE PREFERRED EMBODIMENT

Figure 1:
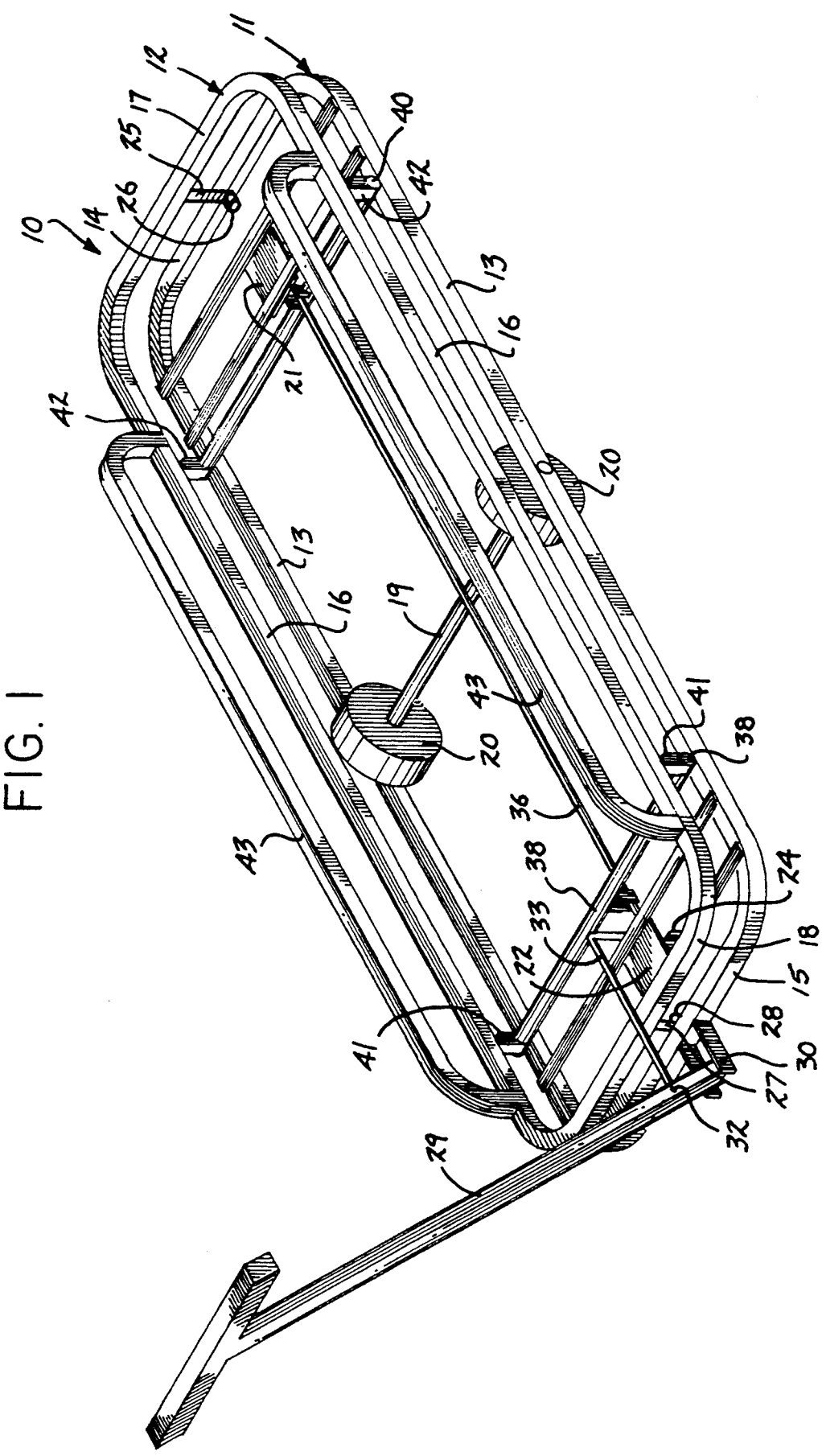
FIG. 1 is an isometric illustration of the invention.

With reference now to the drawings, and in particular to FIGS. 1 to 11 thereof, a new and improved elevator cart apparatus embodying the principles and concepts of the present invention and generally designated by the reference numeral 10 will be described.

More specifically, the elevator cart apparatus 10 of the instant invention essentially comprises a first tubular frame 11 of a generally rectangular configuration, having first frame side rails 13, a first frame first end rail 14, and a first frame second end rail 15. A second tubular frame 12 is arranged for reciprocation relative to the first tubular frame, with the second tubular frame 12 having a second frame first end rail 17, a second frame second end rail 18, and spaced second frame side rails 16, with an individual of the second side rails 16 spaced apart an individual of the first side rails 13. A first axle 19 is rotatably mounted between the first side rails 13, with the first axle 19 including first wheels 20 mounted thereon. A first wheel plate 21 is fixedly mounted to the first frame 11 in adjacency to the first end rail 14, with a second wheel plate 22 coplanar with the second plate 22 fixedly mounted to the first tubular frame 11 in adjacency to the second end rail 15 such that the first wheel plate 21 mounts a first caster wheel 23 and the second wheel plate 22 mounts a second caster wheel 24 to provide ease of transport of the organization, with the caster wheels and the wheel members 20 illustrated in the FIGS. 2 and 3, with the caster wheel structure, and more specifically the second wheel plate 22 mounting the second caster wheel 24, illustrated in FIG. 4.

A first guide rod 25 is fixedly mounted to the second frame first end rail 17, with a second guide rod 27 parallel to the first guide rod fixedly mounted to the second frame second end rail 18. The first guide rod 25 is slidably received through a first guide rod plate 26, that in turn is fixedly mounted to the first frame first end rail 14, with the second guide rod 27 slidably received through a second guide rod plate 28 fixedly mounted to the first frame second end rail 15 to maintain alignment of the first frame 11 to the second frame 12.

Figure 2:
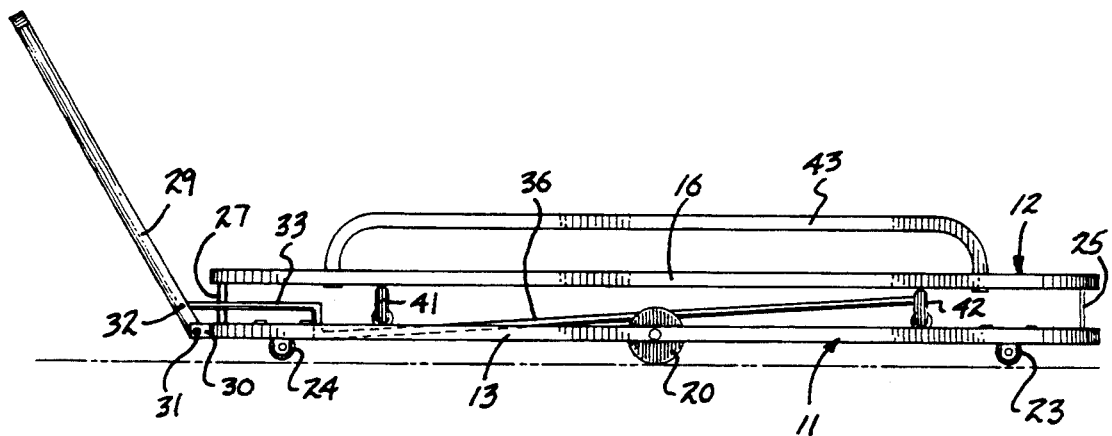
FIG. 2 is an orthographic side view of the cart structure in a raised orientation with the second frame relative to the first frame.
Figure 3:
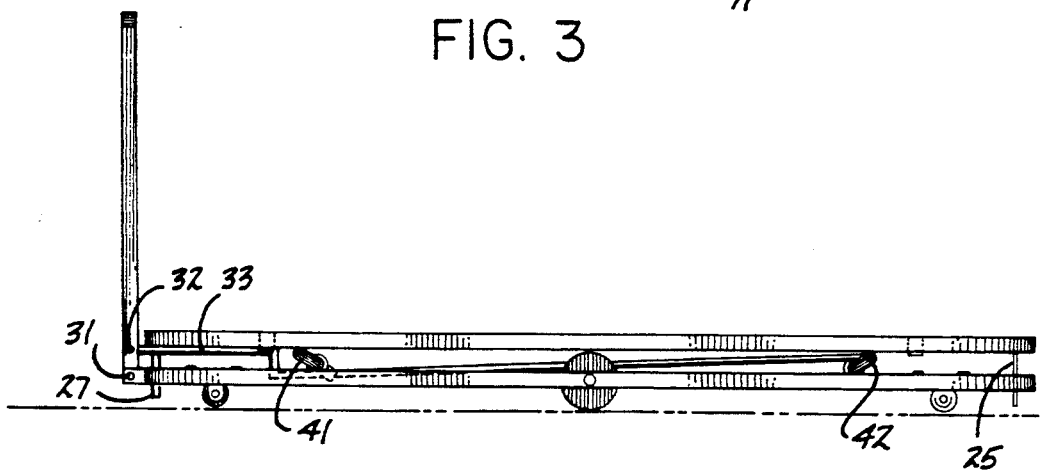
FIG. 3 is an orthographic side view of the second frame arranged for retraction towards the first frame.
Figure 4:
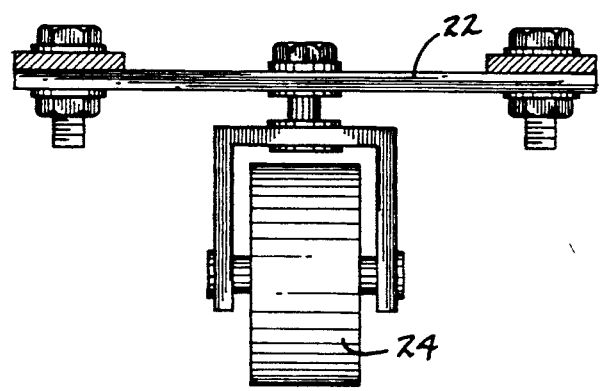
FIG. 4 is an orthographic view of a caster wheel and associated support plate structure.
Figure 5:
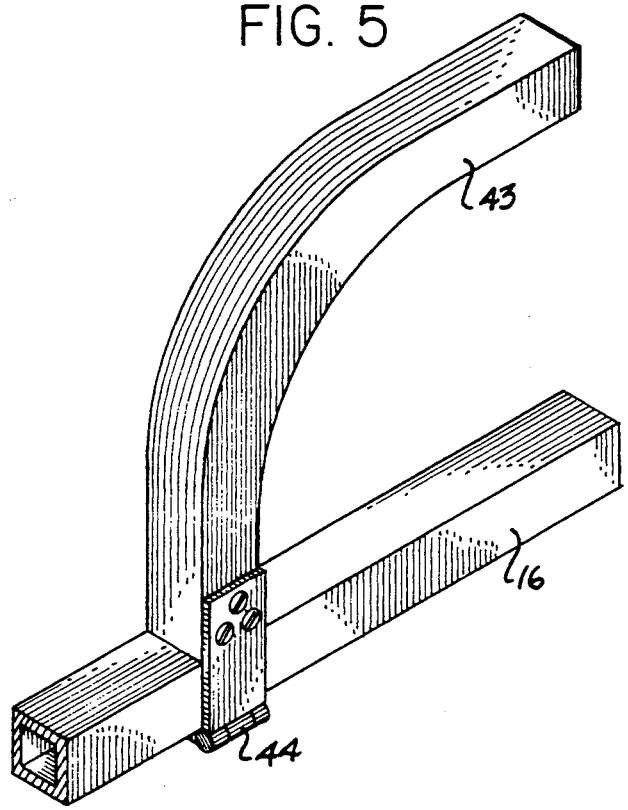
FIG. 5 is an isometric illustration of a side rail member mounted to the second frame.

A handle 29 is provided pivotally mounted between handle support flanges 30 about a first axle 31, with the handle support flanges 30 mounted to the first frame second end rail 15. The handle 29 further includes a second axle 32, with an actuator link 33 having its first end mounted to the second axle 32, with the actuator link 33 having a third axle 35 mounted at its second end pivotally mounting the actuator link to a control link 36 that extends between and parallel the first frame side rails 13. Respective first and second cam rods 38 and 40 are provided orthogonally oriented relative to the control link 36 and rotatably mounted relative to the first frame 11 between the first frame side rails 13. The control link 36 is pivotally mounted to the first cam rod 38 about a fourth axle 37, and the second cam rod is pivotally mounted to the control link 36 about a fifth axle 39 such that upon linear displacement of the control link 36 effects simultaneous rotation of the first and second cam rod 38 and 40, in a manner as indicated in FIGS. 2, 3, and 9-11. The first cam rod 38 includes first cam members 41, with the second cam rod 40 having second cam members 42. Each of the first cam members 41 and each of the second cam members 42 are arranged in abutment to an individual one of the first frame side rails 13, whereupon displacement of the cam members by rotation of the cam rods effects linear displacement of the second frame 12 to the first frame 11, in a manner as indicated in FIGS. 2 and 3 for example.

Figure 6:
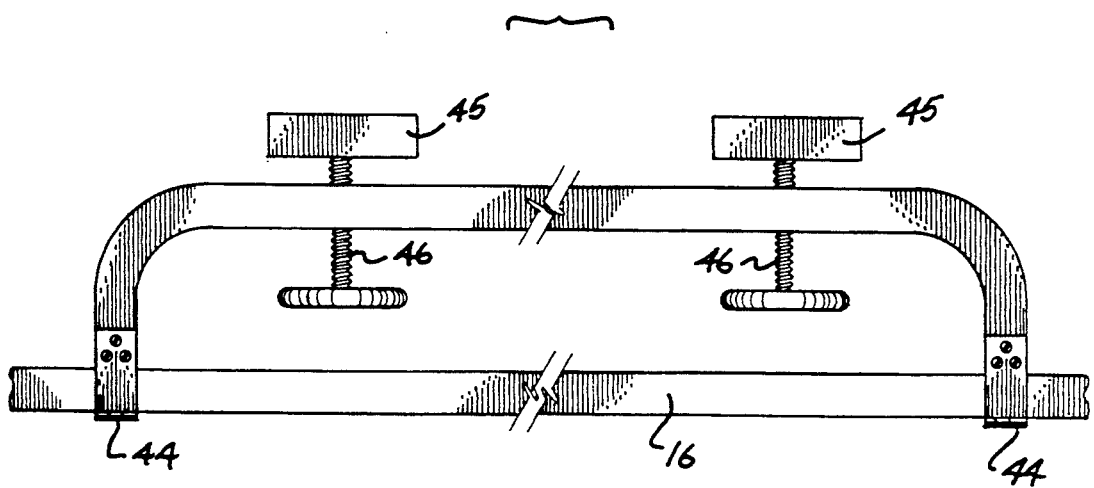
FIG. 6 is a modified side rail structure.

The organization is further arranged to include a guard rail 43 pivotally mounted to each of the second frame side rails 16 about respective guard rail hinges 44. Optionally, each of the guard rails, as indicated in FIG. 6, may employ a plurality of abutment blocks 45 mounted to an adjustment screw 46 directed through an individual one of the guard rails 43. Further, if desired for additional height abutment of the workpiece between the guard rails, an abutment rail 47 is provided, having a plurality of abutment rail recesses 48, with each recess 48 arranged to receive an individual one of the abutment blocks 45. Further, the abutment rail 47 may include, such as indicated in FIG. 7, a further adjuster screw 49 or a plurality thereof, with each further adjuster screw 49 having a further abutment block 50.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An elevator cart apparatus, comprising,
    a first tubular frame, having first frame side rails and a first frame first end rail spaced from a first frame second end rail, and a second tubular frame mounted in a facing relationship relative to the first tubular frame, with the second tubular frame having second frame side rails and a second frame first end rail spaced from a second frame second end rail, and
    elevator means for lifting the second tubular frame relative to the first tubular frame in a reciprocating relationship, said elevator means including a handle having a handle support member mounted to the first frame second end rail, and a first axle mounted to the handle and to the handle support member pivotally mounting the handle to the support member, and a second axle directed through the handle spaced from the first axle, the second axle including said elevator means, mounted to the second axle for lifting and lowering the second tubular frame relative to the first tubular frame, and the elevator means includes an actuator link, the actuator link having an actuator link first end mounted pivotally to the second axle, and an actuator link second end having a third axle, and a control link having a control link first end mounted to the third axle, with the control link oriented between and parallel the first frame side rails, and the elevator means further includes a first cam rod rotatably mounted to the first tubular frame and to the first frame side rails, and a second cam rod arranged in a spaced parallel relationship relative to the first cam rod, wherein the second cam rod is rotatably mounted between the first frame side rails, the first cam rod including first cam members, and the second cam rod having second cam members, each of the first cam members and each of the second cam members are arranged for contiguous and sliding communication with one of the second frame side rails, with the control link having a control link fourth axle spaced from the control link third axle, with the control link fourth axle pivotally mounting the control link to the first cam rod, and a fifth axle pivotally mounted between the second cam rod and the control link, whereupon linear displacement of the control link effects rotation of the first cam rod and the second cam rod.

2. An apparatus as set forth in claim 1 including a first wheel axle, the first wheel axle oriented medially of the first frame side rails orthogonally directed therebetween, wherein the first wheel axle having first wheel members rotatably mounted thereto, and a first caster plate fixedly mounted to the first tubular frame in adjacency to the first frame first end rail, and a second caster plate fixedly mounted to the first frame in adjacency to the first frame second end rail, with a first caster wheel rotatably mounted to the first caster plate and a second caster wheel rotatably mounted to the second caster plate.

3. An apparatus as set forth in claim 2 wherein each of the second frame side rails includes a guard rail, with each guard rail including a plurality of hinges mounting said each guard rail to a respective one of said second frame side rails.

4. An apparatus as set forth in claim 3 wherein each of the guard rails includes at least one adjustment screw directed therethrough, with each adjustment screw including an abutment block, with each abutment block arranged for selective displacement relative to an individual one of said guard rails.

5. An apparatus as set forth in claim 4 including an abutment rail, with said abutment rail including at least one abutment rail recess to receive one of said abutment blocks therewithin, with said abutment rail having a further adjuster screw, and said further adjuster screw including a further abutment block mounted to said further adjuster screw.

* * * * *